US010037129B2

(12) United States Patent
Lewis et al.

(10) Patent No.: US 10,037,129 B2
(45) Date of Patent: *Jul. 31, 2018

(54) MODIFYING A SEGMENT OF A MEDIA ITEM ON A MOBILE DEVICE

(71) Applicant: Google Inc., Mountain View, CA (US)

(72) Inventors: Justin Lewis, Marina del Rey, CA (US); Ruxandra Georgiana Paun, Santa Monica, CA (US)

(73) Assignee: GOOGLE LLC, Mountain View, CA (US)

(*) Notice: Subject to any disclaimer, the term of this patent is extended or adjusted under 35 U.S.C. 154(b) by 428 days.

This patent is subject to a terminal disclaimer.

(21) Appl. No.: 14/015,069

(22) Filed: Aug. 30, 2013

(65) Prior Publication Data

US 2015/0067514 A1    Mar. 5, 2015

(51) Int. Cl.
| | | |
|---|---|---|
| *G06F 3/0481* | (2013.01) |
| *G06F 3/0482* | (2013.01) |
| *G06F 3/0484* | (2013.01) |
| *G11B 27/031* | (2006.01) |
| *G06F 3/0488* | (2013.01) |

(52) U.S. Cl.
CPC ........ *G06F 3/04842* (2013.01); *G06F 3/0482* (2013.01); *G06F 3/0488* (2013.01); *G06F 3/04817* (2013.01); *G11B 27/031* (2013.01); *G06F 3/0484* (2013.01); *G06F 3/04847* (2013.01)

(58) Field of Classification Search
CPC . G11B 27/031; G11B 27/034; G06F 3/04842; G06F 3/0484; G06F 3/04847; G06F 3/0488; G06F 3/04817; G06F 3/0482
See application file for complete search history.

(56) References Cited

U.S. PATENT DOCUMENTS

| | | | | |
|---|---|---|---|---|
| 8,745,500 B1 * | 6/2014 | Kostello | ................... | G06F 3/00 386/282 |
| 8,768,142 B1 * | 7/2014 | Ju | ........................ | H04N 21/274 386/224 |
| 2004/0150663 A1 * | 8/2004 | Kim | ..................... | G11B 27/034 715/723 |
| 2007/0174774 A1 * | 7/2007 | Lerman | ............. | G06F 17/30017 715/723 |
| 2009/0079840 A1 * | 3/2009 | Gandhi | .................. | G11B 27/28 348/222.1 |

(Continued)

*Primary Examiner* — Abdullah Al Kawsar
*Assistant Examiner* — David S Posigian
(74) *Attorney, Agent, or Firm* — Lowenstein Sandler LLP (57) ABSTRACT

Systems and methods for permitting selection and modification of a set of video segments on a mobile device is described. A user interface is provided on a screen of the mobile device to allow a user to select any of a plurality of original video segments of an original video. A selection of at least one of the original video segments is received via the user interface. A request for a modification to the selected at least one original video segment can also be received via the user interface. The systems and methods can cause a modification of the selected at least one original video segment to be performed to provide at least one modified video segment. The at least one modified video segment can be presented via the user interface.

15 Claims, 7 Drawing Sheets

(56) References Cited

U.S. PATENT DOCUMENTS

| | | | | |
|---|---|---|---|---|
| 2009/0313546 | A1* | 12/2009 | Katpelly | H04N 7/17318 |
| | | | | 715/723 |
| 2010/0111498 | A1* | 5/2010 | Weda | G06F 17/30787 |
| | | | | 386/241 |
| 2010/0262913 | A1* | 10/2010 | Takagi | G06F 17/30017 |
| | | | | 715/723 |
| 2010/0281386 | A1* | 11/2010 | Lyons | G06F 3/048 |
| | | | | 715/731 |
| 2011/0292244 | A1* | 12/2011 | Deever | H04N 9/87 |
| | | | | 348/231.2 |
| 2011/0311199 | A1* | 12/2011 | Fay | G11B 27/034 |
| | | | | 386/241 |
| 2012/0030566 | A1* | 2/2012 | Victor | G06F 3/0482 |
| | | | | 715/702 |
| 2012/0148216 | A1* | 6/2012 | Pavagada | H04N 5/772 |
| | | | | 386/278 |
| 2012/0246114 | A1* | 9/2012 | Edmiston | G06T 11/60 |
| | | | | 707/625 |
| 2012/0308209 | A1* | 12/2012 | Zaletel | G11B 27/034 |
| | | | | 386/278 |
| 2013/0047081 | A1* | 2/2013 | Long | G06F 3/0488 |
| | | | | 715/705 |
| 2013/0055087 | A1* | 2/2013 | Flint | G11B 27/034 |
| | | | | 715/723 |
| 2013/0307792 | A1* | 11/2013 | Andres | G11B 27/005 |
| | | | | 345/173 |
| 2013/0332836 | A1* | 12/2013 | Cho | G11B 20/10 |
| | | | | 715/723 |
| 2014/0181666 | A1* | 6/2014 | Moore | G11B 27/034 |
| | | | | 715/716 |
| 2014/0376887 | A1* | 12/2014 | Tijssen | G11B 27/34 |
| | | | | 386/282 |

* cited by examiner

MODIFYING A SEGMENT OF A MEDIA ITEM ON A MOBILE DEVICE

TECHNICAL FIELD

Implementations of the present disclosure relate to a media item editing system, and more specifically, to modifying segments of a media item on a mobile device.

BACKGROUND

Many people record videos on their mobile devices and share those videos with others. In many cases, these videos could benefit from modifications that alter the appearance of the video or improve visual and aural qualities of the video. Often, it is desirable to edit videos in segments instead of editing the entire video at once. Current technologies generally do not allow for meaningful video modifications to be performed on mobile devices on a per-segment basis.

SUMMARY

In some implementations, a computer-implemented method to permit selection and modification of a set of video segments on a mobile device is described. The method includes providing on a screen of the mobile device, a user interface to allow a user to select any of a plurality of original video segments of an original video. The method also includes receiving, via the user interface, a selection of at least one of the original video segments. The method further includes receiving, via the user interface, a request for a modification to the selected at least one original video segment. The method includes causing the modification of the selected at least one original video segment to be performed to provide at least one modified video segment. The method also includes presenting the at least one modified video segment via the user interface.

In other implementations, a system to permit selection and modification of a set of video segments on a mobile device is described. The system includes a user interface to allow a user to select any of a plurality of original video segments of an original video. The user interface receives a selection of at least one of the original video segments. The user interface also receives a request for a modification to the selected at least one original video segment. The system also includes a memory and a processing device coupled with user interface and the memory. The processing device causes the modification of the selected at least one original video segment to be performed to provide at least one modified video segment. The processing device also presents the at least one modified video segment via the user interface.

In some implementations, an apparatus includes means for providing on a screen of a mobile device, a user interface to allow a user to select any of a plurality of original video segments of an original video. The apparatus also includes means for receiving, via the user interface, a selection of at least one of the original video segments. The apparatus further includes means for receiving, via the user interface, a request for a modification to the selected at least one original video segment. The apparatus also includes means for causing the modification of the selected at least one original video segment to be performed to provide at least one modified video segment. The apparatus includes means for presenting the at least one modified video segment via the user interface.

In another implementation, the apparatus includes means for capturing the original video on the mobile device. In other implementations, an apparatus includes means for creating the plurality of original video segments on the mobile device. In another implementation, an apparatus includes means for encoding the modified video segments on the mobile device.

In additional implementations, computing devices for performing the operations described above are also implemented. Further, in some implementations, a computer readable storage medium is provided to store instructions causing a processing device to perform the operations described above.

For illustrative purposes, the description below is described in terms of videos, but the systems, apparatuses and methods described herein can similarly be applicable to any type of media item, including audio, images, video, or any combination thereof.

BRIEF DESCRIPTION OF THE DRAWINGS

The present disclosure is illustrated by way of example, and not by way of limitation, and will become apparent upon consideration of the following detailed description, taken in conjunction with the accompanying drawings, in which like reference characters refer to like parts throughout, and in which.

DETAILED DESCRIPTION

Described herein is a mechanism for modifying a portion (e.g., one or more segments) of a media item (e.g., video) on a mobile device. Conventionally, stationary computers perform video editing because they can have increased computing resources when compared to mobile devices. Such stationary computers can include desktop computers and servers. Users typically capture videos using mobile devices because they are more portable than stationary computers. Once users capture videos on their mobile devices, they can transfer the captured videos from their mobile devices to stationary computers where the videos can then be viewed, edited and shared.

Some mobile devices can perform very basic video editing, but mobile devices usually have limited capabilities for modifying videos. For instance, video stabilization modifications tend to yield better results when using more powerful machines and processors that are not available on mobile devices. Further, conventional mobile devices typically perform modifications to an entire video and do not permit selectively modifying a segment or multiple segments of a video. Thus, using conventional techniques, users can either modify an entire video on a mobile device or transmit the video to another device that performs the modification.

Implementations of the present disclosure address the above deficiencies of conventional systems by providing a mechanism that allows a user to select any number of individual video segments on a mobile device and request a modification for the selected segments. For example, for a video with five segments, a mobile device can receive a selection of any of the five segments, (e.g., four of the segments) and a request to modify the selected segments. The mobile device can cause a modification of the selected segments and can present a video that includes the modifications to the user via a user interface of the mobile device.

Permitting segment-based video selection and modification on a mobile device can improve the quality and creativity of artistic videos, especially for users on the go. Segment-based video modification enables a wide range of video modification options without needing to transfer videos to another computer where video editing is typically performed. For example, filters can be applied to some segments of a video and not to others. Some segments can be deleted and others can be reordered. Audio and text can be added, modified and removed. In some implementations, the mobile device presents a preview of the modifications almost immediately after receiving the request for the modification to allow a user to quickly make decisions on how to modify and enhance a video. Accordingly, aspects of the present disclosure provide an efficient and convenient mechanism that allows a user to select any segments of a video for modification, including multiple segments at a time on a mobile device.

In the following description, numerous details are set forth. It will be apparent, however, to one skilled in the art, that the present disclosure may be practiced without these specific details. In some instances, well-known structures and devices are shown in block diagram form, rather than in detail, in order to avoid obscuring the present disclosure.

The term "video" is used herein for illustrative purposes only, and the present disclosure can also be applied to any type of media content item, such as audio, images, digital movies, digital photos, digital music, website content, social media updates, electronic books (ebooks), electronic magazines, digital newspapers, digital audio books, electronic journals, electronic comic books, software applications, or other media content.

Figure 1:
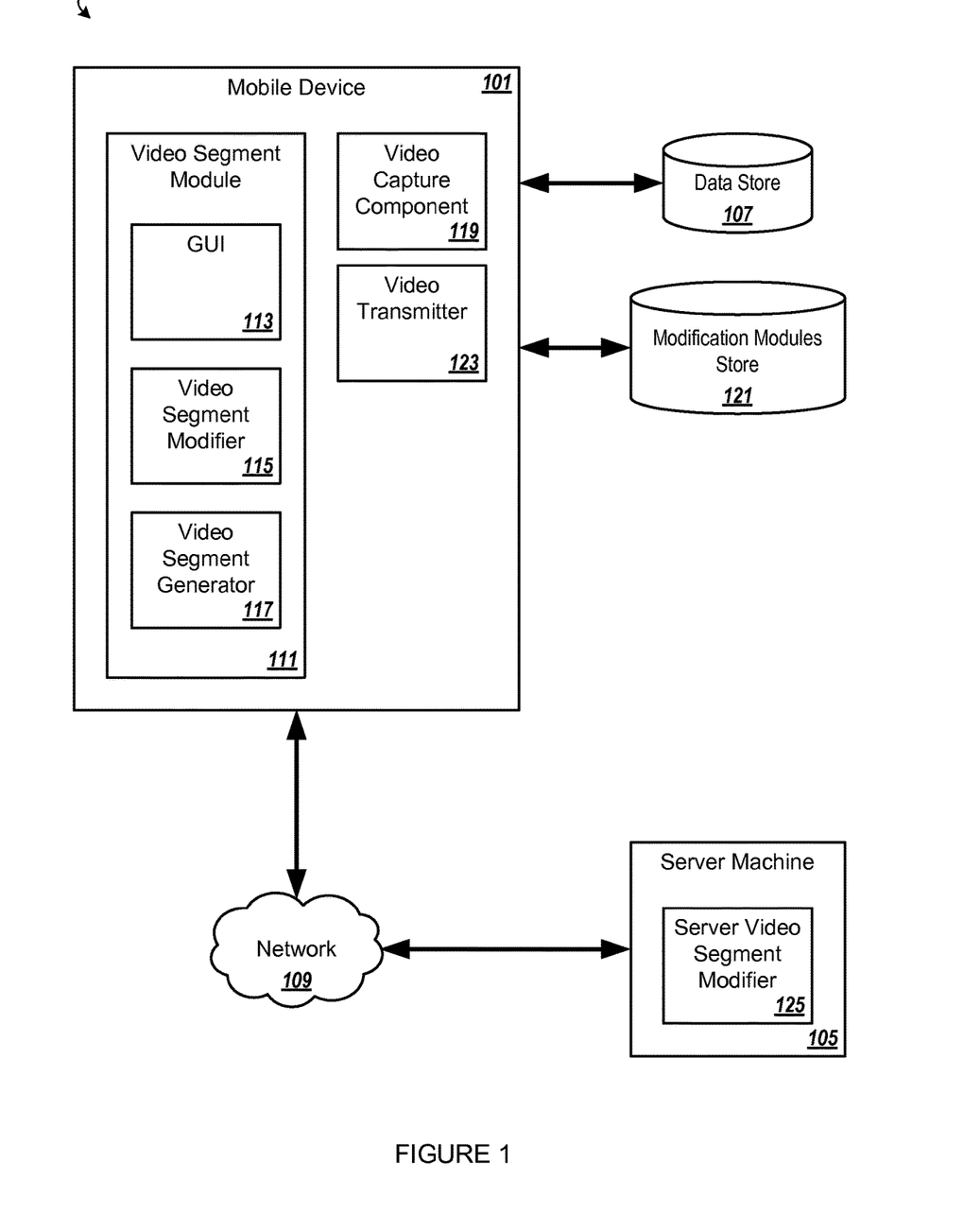
FIG. 1 is a block diagram that illustrates an example system architecture in which implementations of the present disclosure may be implemented.

FIG. 1 illustrates example system architecture 100 in which implementations can operate. The system architecture 100 can include any number of mobile devices 101, one or more server machines 105, and one or more data stores 107 coupled to each other, such as over a network 109. Network 109 may be a public network (e.g., the Internet), a private network (e.g., a local area network (LAN) or wide area network (WAN)), or a combination thereof.

The mobile device 101 can be a portable computing device, such as, and not limited to, cellular telephones, personal digital assistants (PDAs), portable media players, netbooks, laptop computers, an electronic book reader or a tablet computer (e.g., that includes a book reader application), and the like. The mobile device 101 can receive a media item, such as a digital video or a digital movie from any source, such as the data store 107. The mobile device 101 can run an operating system (OS) that manages hardware and software of the mobile device 101.

Server machine 105 can be a rack mount server, a router computer, a personal computer, a portable digital assistant, a laptop computer, a desktop computer, a media center, a tablet, a stationary machine, or any other computing device capable of performing modifications to videos.

The data store 107 can store media items, such as, and not limited to, digital video, digital movies, etc. Media items can be received from any source, including components of the mobile device 101, a server machine 105, another mobile device 101, a video capture component 119, a camera, a remote storage, etc. For example, the data store can store a digital video captured by a video camera of a mobile device 101. The data store 107 can be a persistent storage that is capable of storing data. A persistent storage unit can be a local storage unit or a remote storage unit. Persistent storage units can be a magnetic storage unit, optical storage unit, solid state storage unit, electronic storage units (main memory), or similar storage unit. Persistent storage units can be a monolithic device or a distributed set of devices. A 'set', as used herein, refers to any positive whole number of items. The data store 107 can be internal to the mobile device 101 or external to the mobile device 101 and accessible by the mobile device 101 via a network. As will be appreciated by those skilled in the art, in some implementations data store 107 may be a network-attached file server or a cloud-based file server, while in other implementations data store 107 might be some other type of persistent storage such as an object-oriented database, a relational database, and so forth.

In implementations, the mobile device 101 includes a video segment module 111 to handle video segment operations. The video segment module 111 can include a GUI 113, a video segment modifier 115 and a video segment generator 117. In alternative implementations, the functionality of one or more of the GUI 113, video segment modifier 115 and video segment generator 117 may be combined or divided into additional components.

GUI 113 can be a user interface to allow a user to interact with a mobile device 101. GUI 113 can include one or more user interface tools. As the term is used herein, a user interface tool refers to any single graphical instrument or combination of graphics controls that permit a user to input information to a computer system. Common conventional user interface tools include visual output for one or more buttons, text boxes, scroll bars, pictures, spin dials, list boxes, search boxes, select options, etc.

GUI 113 can present videos to a user and can receive input from the user. Through the GUI 113, video segment module 111 can receive a selection of any segment of an original video from the user. The media item can have predefined segments. In other implementations, segments can be created or added to the original video by a video segment generator 117, as described herein. To select a segment, a user can activate a GUI button that represents a segment of the original video. For example, an original video can have five segments that are represented by buttons that are arranged in a linear manner. To select the second segment, the user can select the second GUI button. The GUI 113 can change the appearance of the selected GUI button to indicate that it has been selected. For example, the GUI buttons can be one color or texture when not selected and another color or texture when selected. The GUI 113 can also receive a request to modify the selected segments of the original video from the user. For example, the GUI 113 can present an option or menu for requesting a modification for the selected video segments. The option or menu can describe available modifications that can be performed on the selected segments. Using the option or menu, the user can request a modification of the selected video segments. The modification can include one or more enhancements to the selected segments the video, such as color correction, stabilization, trim, and others as described herein. In some implementations, the modification can be selected first. Then, the segments to be modified are selected.

The video segment module 111 uses a video segment modifier 115 to perform modifications to video segments. The video segment modifier 115 can perform a modification of the selected video segments in response to the request received by the GUI 113. The modification can alter any characteristic of the video segment, including a video characteristic or an audio characteristic of the segment. The modification can also include changing video segments with respect to other video segments, such as changing a total number of video segments (e.g., adding or removing segments) of the original video, reordering, reversing, or otherwise altering the sequence of the video segments of the original video. For example, a second segment can be moved to a position that is before a first segment.

In addition to providing interface tools, GUI 113 can also be configured to present a preview of the modified video segments that have been generated by the video segment modifier 115. By viewing the modified video segments, the user can decide whether to confirm the request for the modification of the video. GUI 113 can also be configured to receive a confirmation of the request to modify the selected video segments after which the video segment modifier 115 can perform the selected modification to the video segments. In implementations, the video segment modifier 115 can forward the confirmation to a video transmitter 123. Examples of other data that can be presented by GUI 113 are described in further detail in conjunction with FIGS. 2-4.

The video segment module 111 can be coupled to a modification module store 121 that can include algorithms for performing a modification to a video segment. Modification module store 121 can be a persistent storage unit, as described herein.

The modification can be any alteration or enhancement to a video segment. The modification, for example, can be an operation intended to augment, alter, or modify the objective quality or subjective artistic value of the video segment. Any number of modifications can be available. A modification can include filters that modify the appearance of the video segment. Filters can adjust or augment colors, saturation, contrast, brightness, tint, focus, and exposure and can also add effects such as framed borders, color overlay, blur, sepia, lens flares, etc. Other modifications can be spatial transformations, such as cropping or rotation that can alter a spatial property of the video segment, such as size, aspect ratio, height, width, rotation, angle, etc. Other modifications can be simulations of photographic processing techniques (e.g., cross process, High Dynamic Range (HDR), HDR-ish), simulation of particular cameras models (e.g., lomo, holga), or the styles of particular photographers/cinematographers (e.g., Orton, orton-ish). Examples of static modifications may include cross process, cinemascope, adding audio and a mix level for the audio, erasure of specific audio (e.g., removing a song from the video recording), or addition of sound effects, etc. Examples of dynamic modifications can include identifying filters and randomizing inputs (e.g. intensity of effect) over course of the video, filters using inferred depth map info (e.g., foreground color with background black & white, foreground in focus with background blur), speed up, slow down, pausing a frame, tilt-shift simulation, adding a frame outside the video (e.g., video inside an old TV with moving dials), changing the order or length of one or more segments, superimposing things on top of video (e.g. Ryan Gosling, James Van Der Beek), overlaying items on people's faces (e.g. hats, mustaches, etc) that can move with the people in the video, selective focus, miniature faking, tilted focus, adjusting for rotation, 2D to 3D conversion, etc. Other examples include modifications where the user provides little or no input other than clicking an "I'm feeling lucky," "Magic enhancement" or "Magic adjustment" button.

In an example, a user desires to enhance the color of a leopard in two segments (segments A, B) of a five-segment video (segments A, B, C, D, E). The user selects the two segments A and B and the color enhancement. The video segment modifier 115 can execute an algorithm to perform a color enhancement to the leopard, which can be an oversaturation filter that changes the colors of the segments A and B. The user then desires to add a Gaussian blur to two other segments (C, D), selects the segments and the video segment modifier 115 performs the modification.

When a second modification is selected for an already modified segment, the video segment modifier 115 can replace the previous modification—keeping only the most recent modification. Continuing the previous example, the user selects a mosaic overlay for segment C, which already has a Gaussian blur. The video segment modifier 115 discards the Gaussian blur and performs the mosaic overlay to segment C. Alternatively, the video segment modifier 115 can keep the second modification and perform it on the previously modified segment. In a further implementation, the video segment modifier 115 can selectively perform multiple modifications to a video segment. The video segment modifier 115 can identify a category for modifications to the video segment. For example, one category can be for audio modifications while another category can be for video modifications. When a user attempts to apply two video modifications to a video segment, the video segment modifier 115 can keep the second and discard the first. When the user desires to apply two video modifications to a video segment, where the first is a video modification and the second is an audio modification, the video segment modifier 115 can perform both modifications to the video segment.

In implementations, the video segment generator 117 can create segments in an original video. The video segment generator 117 can create segments as a video is being captured. Video segments can be created in response to user input. For example, a GUI can be configured such that when it receives input (e.g., a user activates a mechanical button or a GUI button on a touch screen), the video segment generator 117 can record a segment. In one implementation, the video segment generator 117 creates a segment during continuous input (e.g., a user presses and holds). In another implementation, the video segment generator 117 starts creating a segment at a first input (e.g., user presses a button) and stops creating the segment at a second input (e.g., user presses the button again). In further examples, user gestures can create segments (e.g., a screen swipe to the left can create a new segment). In other implementations, the segments can be created automatically (e.g., machine-based), such as periodically (e.g., every five seconds) or based on other input. For example, when the mobile device 101 is moved, the video segment generator 117 can create a new segment. In another example, when the video capture component 119 detects a change in video input (e.g., light to dark, motion), the video segment generator 117 can create a new segment. Segments can also be created after a video is captured. Segments can be denoted by dividing lines, time stamps, etc. Multiple segments can be create sequentially and combined to provide an original video.

Metadata can be used to define segments within a video. The metadata can include indicators that define a set of boundaries of video segments within a video. The indicators can be time-based. For example, the metadata can include a start time and an end time for each segment. To create a segment in a video that is 0:15 seconds long, a marker can be placed at 0:07 seconds. This creates two segments—a first segment from 0:00 seconds to 0:07 and a second segment from 0:07 seconds to 0:15. Individual segment length is fully adjustable and configurable.

In one implementation, mobile device 101 includes a video capture component 119 that can record, obtain, import, or otherwise capture video. The video capture component 119 can be, for example, an image sensor, camera, video camera, or a combination thereof. Videos captured by video capture component 119 can be modified, as described herein.

In one implementation, the video segment modifier 115 can perform the modification of the video almost immediately after the GUI 113 receives the request. In this manner, the GUI 113 can present a preview of the resulting modified video segments to the user in real time. Similarly, GUI 113 can begin playing the modified video segments and can receive one or more requests for a modification from the user at substantially the same time. This enables a user to quickly preview different modifications to the video segments and decide which of these modifications are likely to produce the result desired by the user.

In implementations, the video segment modifier 115 can modify the video according to a simplified algorithm. The simplified algorithm can be optimized for mobile devices, such that executing the simplified algorithm consumes minimal resources (e.g. computing power, battery life, memory, etc.) of the mobile device. By performing the simplified algorithm, the video segment modifier 115 can generate an approximation of how a complete modification may alter or change the appearance of the video. For example, a complete modification can adjust the brightness of a video. To use less computing resources, a simplified modification can include adjusting portions of the video that are most likely to show a change in brightness. With the simplified modification, black portions of the video might not be modified because they can be less likely to show the change in brightness than in other colors. Once the video segment modifier 115 receives a confirmation input, the video segment modifier 115 can perform the full modification of the selected video segments.

In implementations, the complete modification is performed by another device, such as a server machine 105. The confirmation input is sent to the video transmitter 123. Upon receiving the confirmation input, the video transmitter 123 can transmit the video and instructions for modifying segments of the video to the server machine 105 with a request to modify the selected video segments. For example, when the user activates an "Upload" GUI button on the GUI 113, video transmitter 123 can transmit the original video to a server machine 105 or system of distributed servers (e.g. the "cloud"), or a content hosting service. The video transmitter 123 can also upload the original video to a personal computer, a laptop, or other device with computing power sufficient to perform the actual video modification.

The server machine 105 can receive the original video segments and the request for the modification of the original video segments. Server machine 105 can include a server video segment modifier 125 to perform the modification of the original video segments that the user requested via the mobile device 101. In one implementation, the server machine 105 receives the video and performs the modification to the selected video segments of the received video. In another implementation, the server machine 105 receives the selected segments and performs the modification to the selected video segments. The server machine 105 can combine the modified segments with the original video. Alternatively, the server machine 105 can transmit the modified segments to the mobile device 101, where the video segment modifier 115 can combine the modified segments with the original video. Server machine 105 can include a content hosting service, for example, that can process or generate the modification of the video. Once the modification of the video segments are complete, server machine 105 can make the modified video available for viewing by others (e.g., on the content hosting service's website).

In an example, a user desires to enhance the color of a leopard in a video. The mobile device 101 can execute an algorithm to perform a simplified version of a color enhancement to the leopard, which can be a simple oversaturation filter that changes the colors of the video. Conversely, to perform the complete modification, the server machine 105 can use a much more detailed and complex algorithm to alter the colors of the leopard video. The server machine 105 can also use reference videos to identify the best color match for the leopard. The server machine 105, for example, can use a video hosting service to identify one or more reference videos of leopards and determine color characteristics of the leopards in the reference videos. To enhance the video, the server machine 105 can match the color of the leopard in the video with those in the reference videos.

In other implementations, the mobile device 101 can upload the video to a personal computer, laptop or other "non-cloud device" for performing the modification. Once the modification is performed, these devices can publish the video such that it is viewable at least to the mobile device via a wired or wireless protocol, such as a local network, Bluetooth, Wi-Fi, the internet, etc.

In one implementation, in order to expedite the complete modification of the video segments in anticipation of the user's conformation of the modification request, the mobile device 101 can start uploading the video to the server in parallel with, or prior to, presenting the preview of the video modified with a simplified algorithm. For example, the video can be uploaded 99%, and the final 1% can be uploaded when the GUI 113 receives the user's conformation of the modification request, such as through an "upload" button. This enables a better user experience because the user waits less time for the video to upload and for the complete modification to process.

In some implementations, the video segment modifier 115 can automatically modify one or more segments of the video. Once the user designates a modification in the user interface as being an automatic modification, video segment modifier 115 can automatically modify the video with no further action from the user. An automatic modification requires no additional input, settings or manual adjustment from the user. For example, the user can select a sepia tone filter as an automatic modification. Each subsequent video received by the mobile device 101 can have the sepia filter applied automatically.

In some implementations, such as when the original video is a raw file (e.g., an unprocessed video file, a minimally processed video file, etc), the mobile device 101 can encode the original video, which reduces the file size of the video.

When encoding, the video segment modifier 115 can use any encoding format, including lossy and non-lossy formats. The mobile device can keep the encoded video and transmit the raw file to a server machine 105. When performing a modification to a segment of the encoded video, the video segment modifier 115 can decode the segment, perform the modification, and re-encode the segment.

When all of the segments are encoded as a single file, the segments can be defined in terms of time which can be associated with the encoded file as metadata. To perform a modification to a segment of the encoded video, the video segment modifier 115 can decode the encoded video until the end of the selected segment as defined by the metadata, perform the modification to the selected segment, then re-encode to provide a modified video.

Figure 2A:
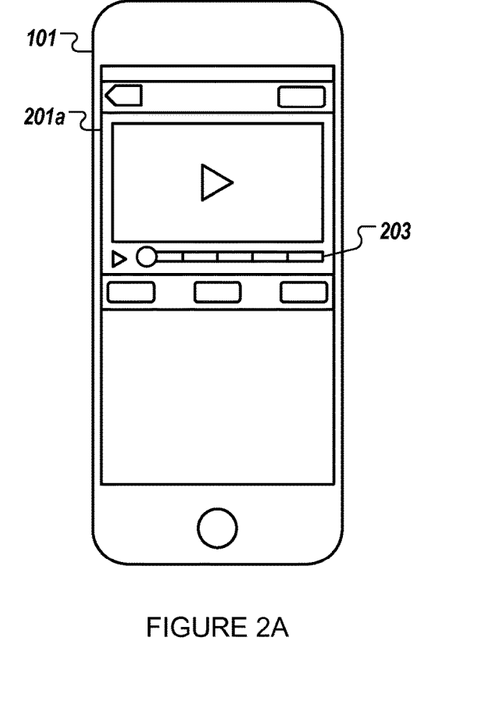
FIGS. 2A and 2B illustrate example graphical user interfaces (GUIs) on a mobile device in accordance with implementations.
Figure 2B:
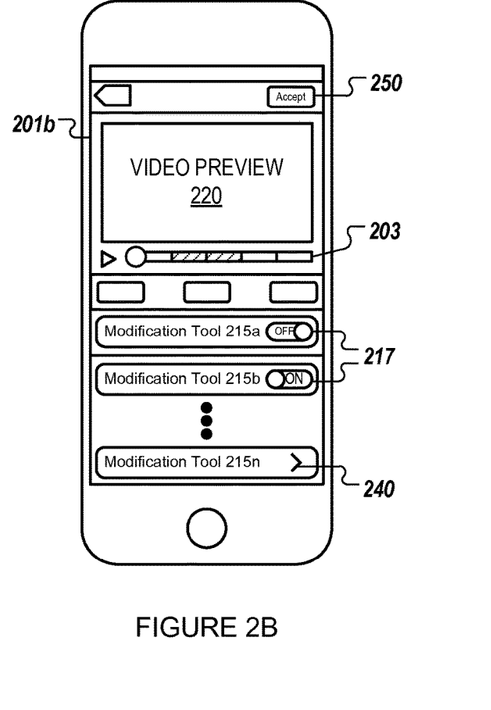

FIGS. 2A and 2B illustrate example GUIs 201 on mobile device 101 in accordance with implementations. Using GUI 201, the user can play the video, select any segment of a video, request a modification to any of the video segments, set privacy settings, share the video via email, text, social network, and the like. The user can use GUI tools to provide input and to navigate to different pages. GUI 201 can include a segment tool 203 that can graphically represent segments of a video. For illustrative purposes, segment tool 203 includes five video segments. Any number of segments is contemplated.

FIG. 2A illustrates a GUI 201a for managing videos using mobile device 101. GUI 201a can receive a selection of one or more video segments. For example, a user can select one of the segments presented by segment tool 203. GUI 201a can have a menu that receives input to navigate to various screens. The menu can direct a user to a video characteristics screen that permits the user to associate various characteristics with the video (e.g., title, location of video, publicly or privately listed on an online video service, etc.). The menu can also be used to navigate to a page or to open a window that enables the user to share videos with others (e.g., via a social network site). The menu can also be used to navigate to a page or open a window that enables the user to provide input pertaining to video segment modifications, as described herein.

FIG. 2B, illustrates a GUI 201b for receiving a request for a modification of any segment of a video. As illustrated by crosshatch, the second and third segments of the segment tool 203 have been selected. GUI 201b can provide one or more modification tools 215a-n that enable a user to select a modification or enhancement to at least one video segment. The types of modifications can be myriad, examples of which are described in conjunction with FIG. 1. GUI 201b can display an On/Off Toggle 217 that can be configured to select or deselect a modification tool 215. In one implementation, a modification can have multiple variations with one or more selectable settings. In this implementation, a user can activate the modification details tool 240 to navigate to another GUI (not shown) that enables the user to adjust the one or more selectable settings to produce the multiple variations.

Video preview area 220 can present the resulting modified video segment. The preview can be in any format and in any aspect ratio. If the user is satisfied with the modifications to the video, the user can provide a confirmation of the request for the modification of the video segment, such as via an accept button 250.

In implementations, when a segment is selected, GUI 201 can present information that indicates if any modifications have been performed to the selected segment. In specific implementations, when a segment is selected, the applied modifications can be described (e.g., via picture, icon, text) via GUI 201. In other implementations, a user can activate the indicator to obtain more information about the applied modifications.

FIGS. 3A-3F illustrate example GUIs 301a-f for selecting one or more video segments. GUI 301 can include a segment tool 305 that can graphically represent segments of a video. For illustrative purposes, segment tool 305 includes five video segments. Any number of segments is contemplated.

Figure 3A:
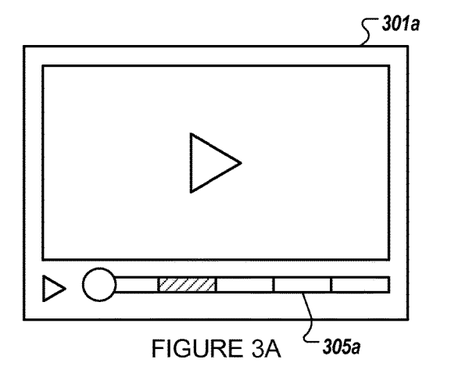
FIGS. 3A-3F illustrate example GUIs for selecting one or more video segments in accordance with implementations.
Figure 3B:
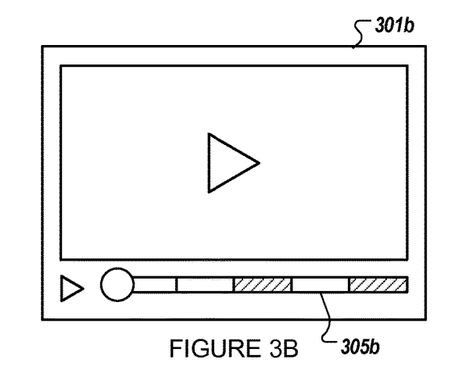
Figure 3C:
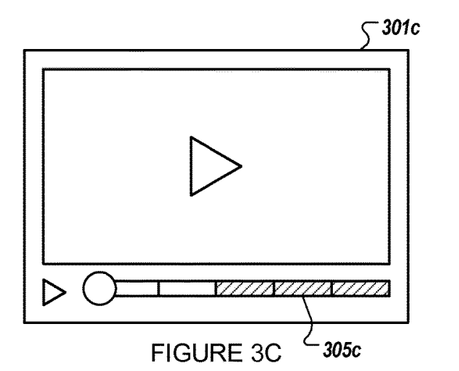
Figure 3D:
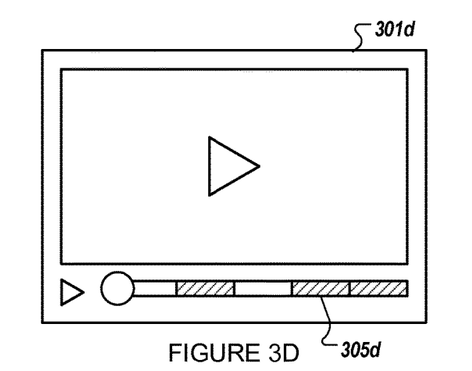
Figure 3E:
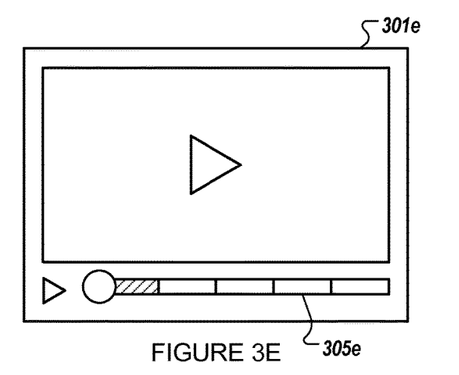
Figure 3F:
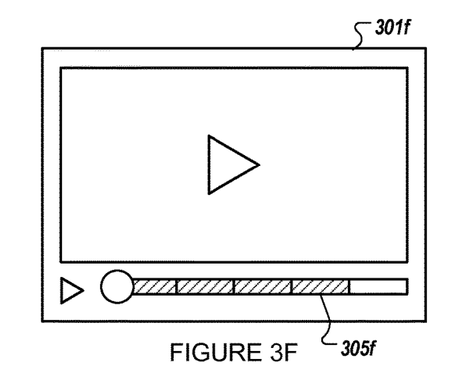

FIG. 3A illustrates one segment of segment tool 305a being selected, the second of five segments. FIG. 3B illustrates two segments of segment tool 305b being selected, the third and fifth of five segments. FIG. 3C illustrates three segments of segment tool 305c being selected, the third, fourth and fifth of five segments. FIG. 3D illustrates three segments of segment tool 305d being selected, second, fourth and fifth of five segments. FIG. 3E illustrates one segment of segment tool 305e being selected, the first of five segments, which is not the last segment of the segment tool 305e. FIG. 3F illustrates four segments of segment tool 305f being selected, the first, second, third and fourth of five segments, none of which are the last segment.

Figure 4:
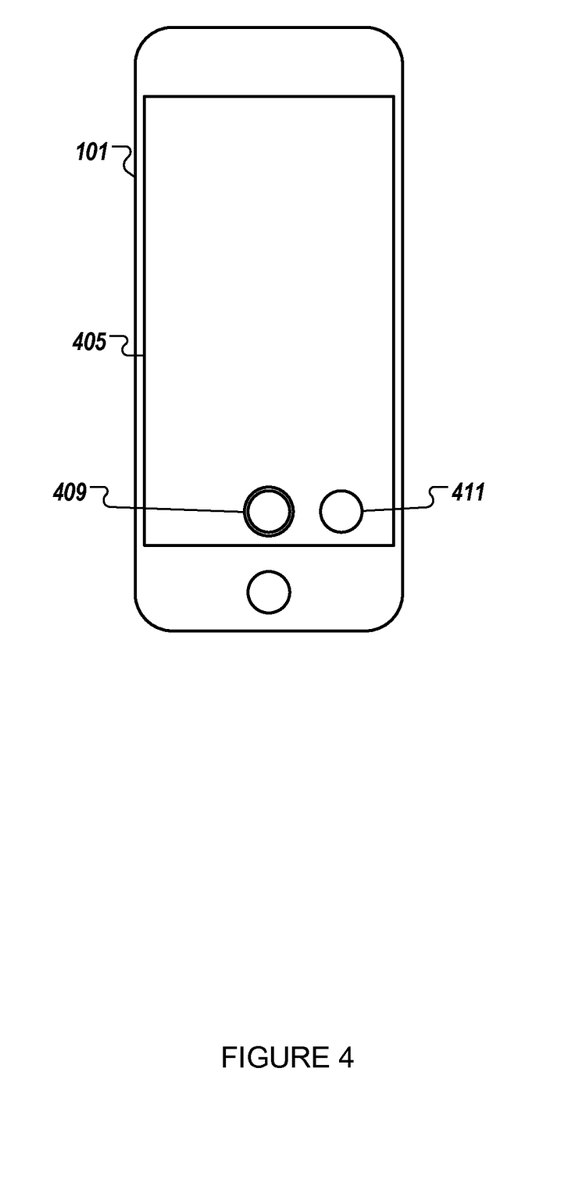
FIG. 4 illustrates an example GUI for creating video segments on a mobile device in accordance with implementations.

FIG. 4 illustrates an example GUI 405 for creating video segments on a mobile device 101 in accordance with implementations. Using GUI 405, the user can capture and record video by activating record button 409. When record button 409 is activated (e.g., touched with a finger), video can begin recording and a beginning of a video segment can be created at the same time. When the record button 409 is deactivated (e.g., finger is removed), then the end of the video segment is defined and the video segment is created, having a duration of the time the record button 409 was activated. The video segment can also be created when the record button 409 is activated a first time (e.g., a first button press) and activated a second time (e.g., a second button press). In this instance, the duration of the video segment is the time between video activations. In another implementation, while the mobile device 101 is capturing video, a separate GUI button 411 can be used to define markers that are used to create segments. For example, when a user activates GUI button 411 after five second of video capture, a marker is inserted at the five second mark. The first segment is defined as being between zero and five seconds of the video. The second segment begins at five seconds and ends either when the user activates GUI button 411 again, or stops video recording.

Figure 5:
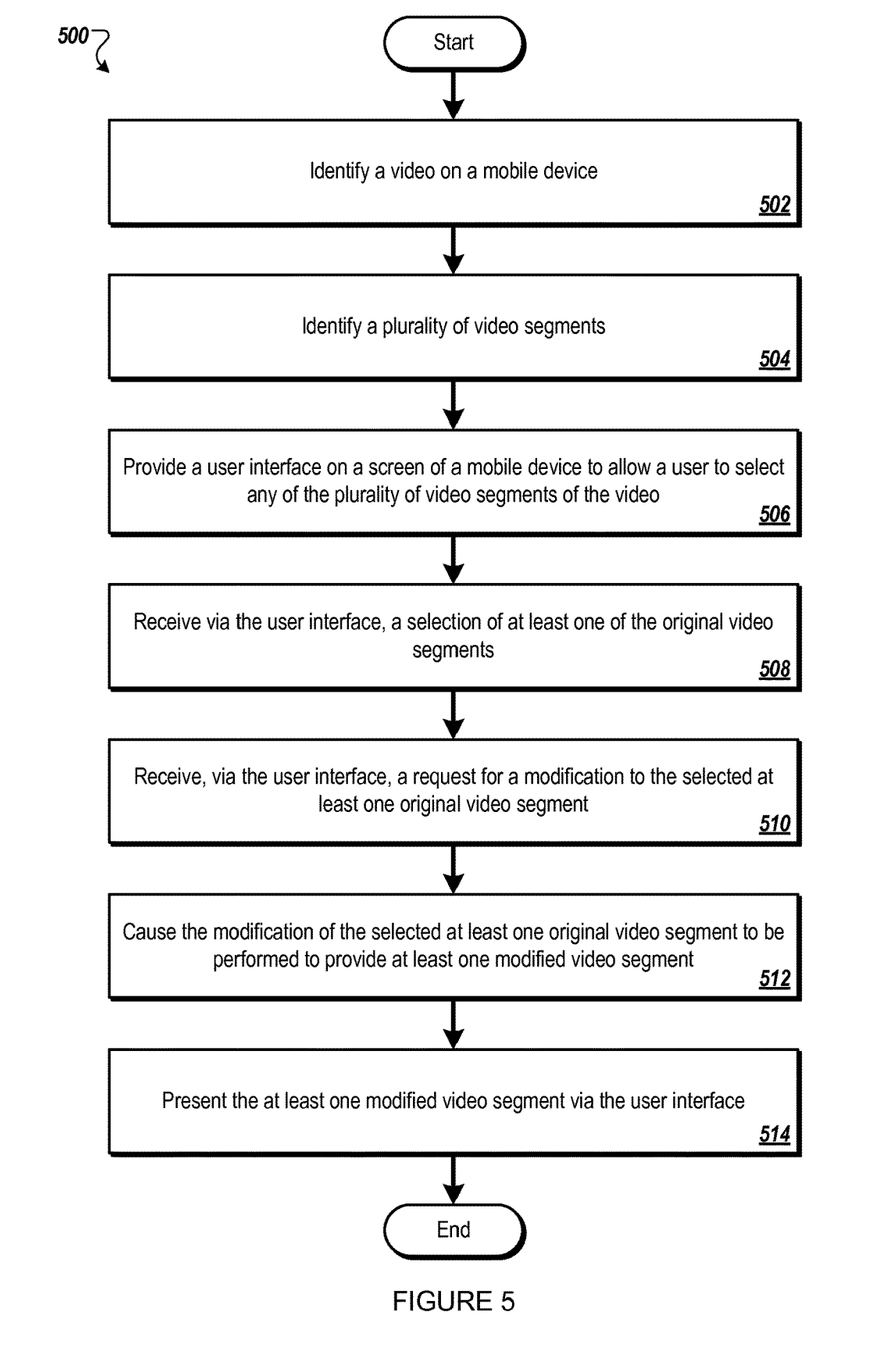
FIG. 5 is a flow diagram illustrating an implementation of a method for selecting and modifying any segment of a video in accordance with implementations.

FIG. 5 is a flow diagram illustrating an implementation of a method 500 for selecting and modifying any segment of a video. Method 500 can be performed by processing logic (e.g., in computing system 700 of FIG. 7) that may comprise hardware (e.g., circuitry, dedicated logic, programmable logic, microcode, etc.), software (such as instructions run on a processing device), firmware, or a combination thereof. In one implementation, method 500 is performed primarily by video segment modifier 115 of FIG. 1.

At block 502 of method 500, processing logic identifies an original video on a mobile device. In implementations, processing logic can capture the original video on the mobile device. Processing logic can also receive an original video from a data store, a remote location, or from any other source.

At block 504, processing logic identifies video segments of the original video. In implementations, processing logic can create the video segments of the original video. In other implementations, the video segments of the original video can be defined prior to processing logic identifying the original video at block 502.

At block 506, processing logic provides on a screen of a mobile device, a user interface to allow a user to select any of the segments of the original video. For example, processing logic can implement a GUI on a mobile device that presents a graphical representation of video segments in the GUI.

At block 508, processing logic receives a selection of at least one of the original video segments. When implementing a GUI that presents a graphical representation of video segments in the GUI, processing logic can alter the graphical representation of the selected video segments.

At block 510, processing logic receives a request for a modification to the selected video segment. The request can be user-based or machine-based, as described herein. At block 512, processing logic causes the modification of the selected video segments to be performed to form a modified video segment, as described above and in conjunction with FIG. 6.

At block 514, processing logic presents the modified video segment via the user interface. Processing logic can present the modified video segment by itself or in conjunction with other segments of a video.

Figure 6:
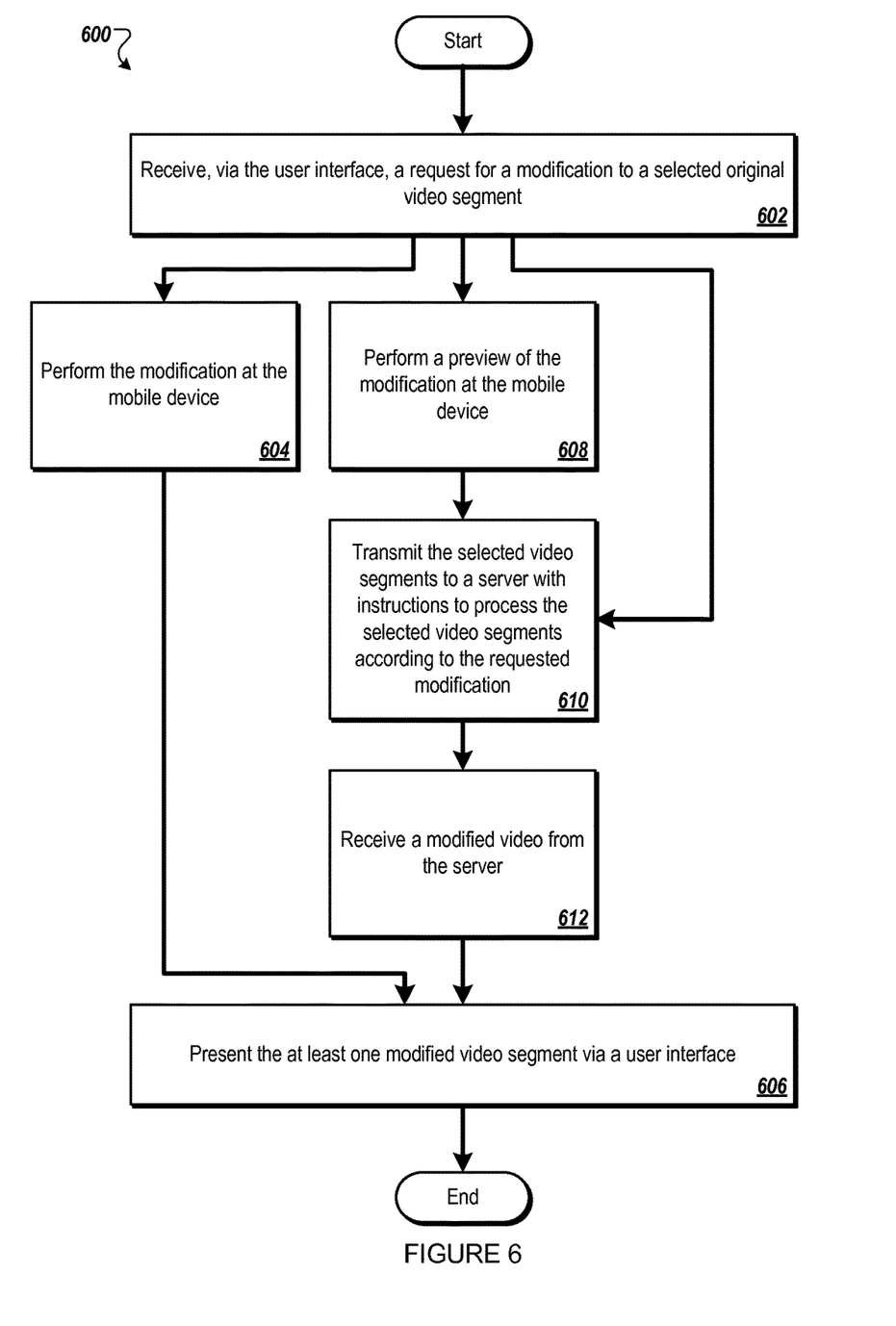
FIG. 6 is a flow diagram illustrating an implementation of a method for modifying any segment of a video in accordance with implementations.

FIG. 6 is a flow diagram illustrating an implementation of a method 600 for modifying any segment of a video. Method 600 can be performed by processing logic (e.g., in computing system 700 of FIG. 7) that may comprise hardware (e.g., circuitry, dedicated logic, programmable logic, microcode, etc.), software (such as instructions run on a processing device), firmware, or a combination thereof. In one implementation, method 600 is performed primarily by video segment modifier 115 of FIG. 1.

At block 602 of method 600, processing logic receives a request for a modification to the selected video segment on a mobile device. In one implementation, processing logic can proceed to block 604 where it performs the modification to the video segment at the mobile device and then presents the modified video segment via a user interface of the mobile device at block 606. In implementations, processing logic can create a modified video by combining the modified video segment with the original video.

In another implementation, after block 602, processing logic can perform a preview or lightweight modification of the selected video segment at the mobile device at block 608. At block 610, processing logic transmits the selected video segment to a server with instructions to perform the requested modification to the selected video segment. In implementations, the video segments can be transmitted individually to the server with metadata that describes the order of the segments. In other implementations, a single file can be transmitted to the server that includes metadata that describes the segments (e.g., as time slices). The single file can be the original video or can be a package of a set of segments. The server can use the metadata to deconstruct or unpackage the single file into segments. The server can then perform the modification per the instructions.

At block 612, processing logic can receive the modified video segment from the server. In implementations, processing logic receives the modified video segment by itself. In other implementations, processing logic receives the modified video segment as part of a group of video segments. In further implementations, processing logic receives the modified video segment as part of a modified video, where the modified video is the original video that includes the modified video segment.

In one implementation, after block 602, processing logic can skip block 608 and transmit the selected video segment to a server with instructions to process the selected video segment according to the requested modification. At block 606, processing logic presents the modified video segment via a user interface of the mobile device.

Figure 7:
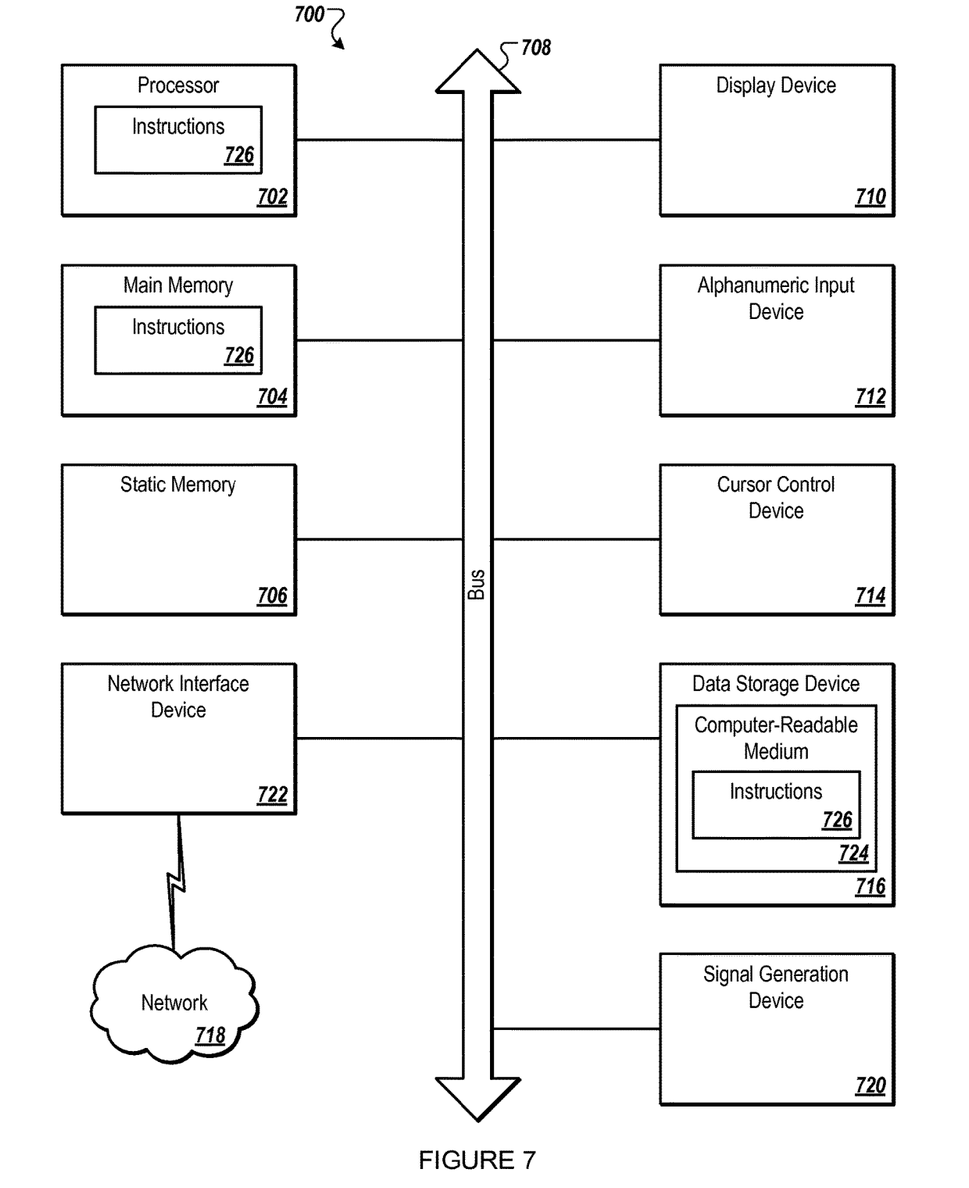
FIG. 7 illustrates an example computer system that facilitates the modification of a segment of a media item.

FIG. 7 is a schematic diagram that shows an example of a machine in the form of a computer system 700. The computer system 700 executes one or more sets of instructions 726 that cause the machine to perform any one or more of the methodologies discussed herein. The machine may operate in the capacity of a server or a client machine in client-server network environment, or as a peer machine in a peer-to-peer (or distributed) network environment. The machine may be a personal computer (PC), a tablet PC, a set-top box (STB), a personal digital assistant (PDA), a mobile telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute the sets of instructions 726 to perform any one or more of the methodologies discussed herein.

The computer system 700 includes a processor 702, a main memory 704 (e.g., read-only memory (ROM), flash memory, dynamic random access memory (DRAM) such as synchronous DRAM (SDRAM) or Rambus DRAM (RDRAM), etc.), a static memory 706 (e.g., flash memory, static random access memory (SRAM), etc.), and a data storage device 716, which communicate with each other via a bus 708.

The processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 may also be one or more special-purpose processing devices such as an application specific integrated circuit (ASIC), a field programmable gate array (FPGA), a digital signal processor (DSP), network processor, or the like. The processor 702 is configured to execute instructions of the video segment module 111 for performing the operations and steps discussed herein.

The computer system 700 may further include a network interface device 722 that provides communication with other machines over a network 718, such as a local area network (LAN), an intranet, an extranet, or the Internet. The computer system 700 also may include a display device 710 (e.g., a liquid crystal display (LCD) or a cathode ray tube (CRT)), an alphanumeric input device 712 (e.g., a keyboard), a cursor control device 714 (e.g., a mouse), and a signal generation device 720 (e.g., a speaker).

The data storage device 716 may include a computer-readable storage medium 724 on which is stored the sets of instructions 726 of the video segment module 111 embodying any one or more of the methodologies or functions described herein. The sets of instructions 726 of the video segment module 111 may also reside, completely or at least partially, within the main memory 704 and/or within the processor 702 during execution thereof by the computer system 700, the main memory 704 and the processor 702 also constituting computer-readable storage media. The sets of instructions 726 may further be transmitted or received over the network 718 via the network interface device 722.

While the example of the computer-readable storage medium 724 is shown as a single medium, the term "computer-readable storage medium" can include a single medium or multiple media (e.g., a centralized or distributed database, and/or associated caches and servers) that store the sets of instructions 726. The term "computer-readable storage medium" can include any medium that is capable of storing, encoding or carrying a set of instructions for execution by the machine and that cause the machine to perform any one or more of the methodologies of the present disclosure. The term "computer-readable storage medium" can include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

The components and other features described herein can be implemented as discrete hardware components or integrated in the functionality of hardware components such as ASICs, FPGAs, DSPs or similar devices. In addition, these components can be implemented as firmware or functional circuitry within hardware devices. Further, these components can be implemented in any combination of hardware devices and software components.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "capturing", "performing", "causing", "encoding", "storing," "receiving," "assigning," "generating," "presenting," "transmitting," "obtaining," "displaying," "forming," or the like, may refer to the actions and processes of a machine, a computer system, or similar electronic computing device, that manipulates and transforms data represented as physical (e.g., electronic) quantities within the machine's registers and memories into other data similarly represented as physical quantities within the machine memories or registers or other such information storage, transmission or display devices.

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form.

For simplicity of explanation, the methods have been depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture (e.g., a computer readable storage medium) to facilitate transporting and transferring such methods to computing devices. The term article of manufacture, as used herein, is intended to encompass a computer program accessible from any computer-readable device or storage media.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

Although the operations of the methods herein are shown and described in a particular order, the order of the operations of each method may be altered so that certain operations may be performed in an inverse order or so that certain operation may be performed, at least in part, concurrently with other operations. In another implementation, instructions or sub-operations of distinct operations may be in an intermittent and/or alternating manner.

Reference throughout this disclosure to "one implementation," or "an implementation" means that a particular feature, structure, or characteristic described in connection with the implementation or implementation is included in at least one implementation. Thus, the appearances of the phrase "in one implementation," or "in an implementation" in various places throughout this specification are not necessarily all referring to the same implementation. Furthermore, the particular features, structures, or characteristics may be combined in any suitable manner in one or more implementations.

Implementations also relate to an apparatus for performing the operations herein. This apparatus may be specially constructed for the required purposes or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs and magnetic-optical disks, read-only memories (ROMs), random access memories (RAMs), EPROMs, EEPROMs, magnetic or optical cards, flash memory devices including universal serial bus (USB) storage devices (e.g., USB key devices) or any type of media suitable for storing electronic instructions, each of which may be coupled to a computing system bus.

The methods and systems described herein can be used in a wide variety of implementations, including as part of a mobile application ("app"), and can be part of photo or video-related software including a mobile operating system. Apps installed on the mobile device can access the systems and methods via one or more application programming interface (API).

The algorithms and displays presented herein are not inherently related to any particular computing system or other apparatus. Various general purpose systems may be used with programs in accordance with the teachings herein or it may prove convenient to construct more specialized apparatus to perform the required method steps. The required structure for a variety of these systems will be apparent from the description above. In addition, the present disclosure is not described with reference to any particular programming language. It will be appreciated that a variety of programming languages may be used to implement the teachings of the disclosure as described herein.

What is claimed is:

1. A method comprising:
providing on a screen of a mobile device, a user interface to allow a user to select any of a plurality of original video segments of an original video, wherein the original video is captured using a recording user interface element, and the plurality of original segments are defined in response to a user activating and deactivating the recording user interface element during a continuous capture of the original video, and wherein the user interface comprises a time bar representing the plurality of original video segments by a plurality of buttons;
receiving, via the user interface, a selection of at least one of the original video segments via a corresponding at least one of the plurality of buttons on the time bar;
modifying, in the user interface, an appearance of the corresponding at least one of the plurality of buttons to graphically represent the selected at least one original video segment;
receiving, via the user interface, a request for a complete modification to the selected at least one original video segment while graphically representing the selected original video segment in the user interface on the screen of the mobile device;
performing, on the mobile device, a simplified version of the complete modification of the selected at least one original video segment to provide at least one modified video segment, wherein the complete modification includes more operations than the simplified version of the complete modification, and wherein performing the simplified version of the complete modification of the selected at least one original video segment involves less computing resources than performing the complete modification of the selected at least one original video segment;
presenting a preview of the at least one modified video segment via the user interface while starting a transmission of the selected at least one original video segment to a server in anticipation of a user confirmation of the simplified version of the complete modification based on the preview;
receiving the user confirmation of the simplified version of the complete modification based on the preview; and
in response to receiving the user confirmation, completing the transmission of the selected at least one original video segment to the server to perform the complete modification of the selected at least one original video segment at the server.

2. The method of claim 1, wherein the recording user interface element is a record button presented on the screen of the mobile device.

3. The method of claim 1, wherein the complete modification is to alter at least one of a video characteristic, an audio characteristic, a total number of video segments, or an order of video segments.

4. The method of claim 1, wherein the original video is in a raw format and comprises metadata to define the plurality of original video segments.

5. The method of claim 4, further comprising identifying the plurality of original video segments using indicators in the metadata that define a set of segment boundaries within the original video.

6. The method of claim 1, further comprising encoding the at least one modified video segments on the mobile device.

7. The method of claim 1, wherein presenting the at least one modified video segment via the user interface comprises presenting a description of the modification via the user interface.

8. The method of claim 1, wherein:
the selected at least one of the original video segments comprises two or more selected original video segments; the corresponding at least one of the plurality of buttons comprises two or more corresponding buttons that graphically represent the two or more selected original video segments; and the at least one modified video segment comprises two or more modified video segments.

9. A system, comprising:
a user interface displayed on a screen of a mobile device to:
allow a user to select any of a plurality of original video segments of an original video, wherein the original video is captured using a recording user interface element, and the plurality of original segments are defined in response to a user activating and deactivating the recording user interface element during a continuous capture of the original video, and wherein the user interface comprises a time bar representing the plurality of original video segments by a plurality of buttons;
receive a selection of at least one of the original video segments via a corresponding at least one of the plurality of buttons on the time bar;
modify an appearance of the corresponding at least one of the plurality of buttons to graphically represent the selected at least one original video segment;
receive a request for a complete modification to the selected at least one original video segment while graphically representing the selected at least one original video segment in the user interface on the screen of the mobile device;
a memory; and
a processor coupled with user interface and the memory to:
perform, on the mobile device, a simplified version of the complete modification of the selected at least one original video segment to provide at least one modified video segment, wherein the complete modification includes more operations than the simplified version of the complete modification, and wherein performing the simplified version of the complete modification of the selected at least one original video segment involves less computing resources than performing the complete modification of the selected at least one original video segment;

present a preview of the at least one modified video segment via the user interface while starting a transmission of the selected at least one original video segment to a server in anticipation of a user confirmation of the simplified version of the complete modification based on the preview;

receive the user confirmation of the simplified version of the modification based on the preview; and in response to receiving the user confirmation, complete the transmission of the selected at least one original video segment to the server to perform the complete modification of the selected at least one original video segment at the server.

10. The system of claim 9, wherein the recording user interface element is a record button presented on the screen of the mobile device.

11. A non-transitory computer readable storage medium including instructions thereon that, in response to execution by a processor, cause the processor to perform operations comprising:

providing on a screen of a mobile device, a user interface to allow a user to select any of a plurality of original video segments of an original video, wherein the original video is captured using a recording user interface element, and the plurality of original segments are defined in response to a user activating and deactivating the recording user interface element during a continuous capture of the original video, and wherein the user interface comprises a time bar representing the plurality of original video segments by a plurality of buttons;

receiving, via the user interface, a selection of at least one of the original video segments via a corresponding at least one of the plurality of buttons on the time bar;

modifying, in the user interface, an appearance of the corresponding at least one of the plurality of buttons to graphically represent the selected at least one original video segment;

receiving, via the user interface, a request for a complete modification to the selected at least one original video segment while graphically representing the selected at least one original video segment in the user interface on the screen of the mobile device;

performing, on the mobile device, a simplified version of the complete modification of the selected at least one original video segment to provide at least one modified video segment, wherein the complete modification includes more operations than the simplified version of the complete modification, and wherein performing the simplified version of the complete modification of the selected at least one original video segment involves less computing resources than performing the complete modification of the selected at least one original video segment;

presenting a preview of the at least one modified video segment via the user interface while starting a transmission of the selected at least one original video segment to a server in anticipation of a user confirmation of the simplified version of the complete modification based on the preview;

receiving the user confirmation of the simplified version of the complete modification based on the preview; and in response to receiving the user confirmation, completing the transmission of the selected at least one original video segment to the server to perform the complete modification of the selected at least one original video segment at the server.

12. The non-transitory computer readable storage medium of claim 11, wherein the complete modification is to alter at least one of a video characteristic, an audio characteristic, a total number of video segments, or an order of video segments.

13. The non-transitory computer readable storage medium of claim 11, wherein the recording user interface element is a record button presented on the screen of the mobile device.

14. The non-transitory computer readable storage medium of claim 11, wherein the original video is in a raw format and comprises metadata to define the plurality of original video segments, the operations further comprising identifying the plurality of original video segments using indicators in the metadata that define a set of segment boundaries within the original video.

15. The non-transitory computer readable storage medium of claim 11, wherein presenting the at least one modified video segment via the user interface comprises presenting a description of the modification via the user interface.

* * * * *